United States Patent
Mezeul et al.

(10) Patent No.: US 7,450,578 B2
(45) Date of Patent: Nov. 11, 2008

(54) METHOD OF ADDRESSING AND ROUTING DATA

(75) Inventors: Michael J. Mezeul, Allen, TX (US); Nimer Yaseen, Allen, TX (US); Abinder S. Dhillon, Plano, TX (US); Charlie Stevens, Hurst, TX (US)

(73) Assignee: Fujitsu Limited, Kawasaki (JP)

( * ) Notice: Subject to any disclaimer, the term of this patent is extended or adjusted under 35 U.S.C. 154(b) by 707 days.

(21) Appl. No.: 09/978,429

(22) Filed: Oct. 15, 2001

(65) Prior Publication Data

US 2002/0181457 A1 Dec. 5, 2002

Related U.S. Application Data

(60) Provisional application No. 60/295,151, filed on Jun. 1, 2001.

(51) Int. Cl.
*H04L 12/56* (2006.01)

(52) U.S. Cl. .................................. 370/389; 370/401

(58) Field of Classification Search ................ 370/355, 370/352, 351, 389, 235, 392, 401, 471
See application file for complete search history.

(56) References Cited

U.S. PATENT DOCUMENTS

| | | | | |
|---|---|---|---|---|
| 5,168,498 A * | 12/1992 | Adams et al. | ................ | 370/349 |
| 5,210,743 A * | 5/1993 | Eilenberger et al. | ......... | 370/422 |
| 5,265,091 A * | 11/1993 | van Landegem | ............ | 370/232 |
| 5,278,831 A * | 1/1994 | Mabey et al. | ................ | 370/349 |
| 5,309,433 A * | 5/1994 | Cidon et al. | ................ | 370/390 |
| 5,438,566 A * | 8/1995 | Masetti et al. | ............... | 370/355 |
| 5,442,633 A * | 8/1995 | Perkins et al. | .............. | 370/331 |
| 5,600,638 A * | 2/1997 | Bertin et al. | ................ | 370/351 |
| 5,638,377 A * | 6/1997 | Quinquis et al. | ............ | 370/392 |
| 5,724,347 A * | 3/1998 | Bell et al. | .................... | 370/377 |
| 5,787,072 A * | 7/1998 | Shimojo et al. | ............. | 370/231 |
| 5,796,715 A * | 8/1998 | Patterson et al. | ............ | 370/349 |
| 5,809,025 A * | 9/1998 | Timbs | ......................... | 370/400 |
| 5,828,835 A * | 10/1998 | Isfeld et al. | ................. | 709/200 |
| 5,996,021 A * | 11/1999 | Civanlar et al. | ............. | 709/238 |
| 6,163,527 A | 12/2000 | Ester et al. | | |
| 6,246,669 B1 * | 6/2001 | Chevalier et al. | ........... | 370/238 |
| 6,647,428 B1 * | 11/2003 | Bannai et al. | ............... | 709/245 |
| 6,683,865 B1 * | 1/2004 | Garcia-Luna-Aceves et al. | ......................... | 370/349 |
| 6,795,917 B1 * | 9/2004 | Ylonen | ....................... | 713/160 |

(Continued)

OTHER PUBLICATIONS

Multiprotocol Label Switching Architecture by Eric C. Rosen (Cisco Systems, Inc.), Arun Viswanathan (Force10 Networks, Inc.), Ross Callon (Juniper Networks, Inc.); Jul. 2000; Network Working Group; Internet Draft.*

(Continued)

*Primary Examiner*—Brian D Nguyen
(74) *Attorney, Agent, or Firm*—Gardere Wynne Sewell LLP

(57) ABSTRACT

A method of routing packets in a system includes the steps of receiving a plurality of packets, each packet including a routing label and a packet type, routing each packet to a destination within the system specified in the routing label in response to the packet type being indicative of a data packet, and routing each packet to a processor within the system and sending a reply packet to a sender specified in the routing label in response to the packet type being indicative of a control packet.

21 Claims, 2 Drawing Sheets

U.S. PATENT DOCUMENTS 6,894,969 B1 * 5/2005 Chidambaran et al. ...... 370/216
6,987,762 B2 * 1/2006 Shiota ........................ 370/389

OTHER PUBLICATIONS

World Wide Web, http://www.cis.ohio-state.edu/~jain/cis788-97/virtual_lans/index.htm, Suba Varadarajan, "Virtual Local Area Networks", printed on Feb. 7, 2000, 12 pages.

World Wide Web, http://www.ietf.org/internet-drafts/draft-ieft-mpls-arch-07.txt, Eric C. Rosen, "Multiprotocol Label Switching Architucture", printed on Jan. 9, 2001, 55 pages.

World Wide Web, http://www.ietf.org/internet-drafts/draft-ietf-mpls-generalized-rsvp-te-00Peter Ashwood-Smith, et al., "Generalized MPLS Signaling-RSVP-TE Extensions", printed on Jan. 9, 2001, 19 pages.

Yates, Jennifer, et al., "Reconfiguration in IP Over WDM Access Networks", AT&T Labs—Research, AT&T Shannon Laboratories, 4 pages.

Copyright 2000 by the Institute of Electrical and Electronics Engineers, Inc., "Local and Metropolitan Area Networks", IEEE Standard for Information technology, published Oct. 16, 2000, pp. 40-50.

* cited by examiner

METHOD OF ADDRESSING AND ROUTING DATA

This application claims priority to U.S. Provisional Application No. 60/295,151 filed Jun. 1, 2001 entitled, "Method of Addressing and Routing Data."

TECHNICAL FIELD OF THE INVENTION

This invention relates to telecommunication network and equipment, and more particularly, to a method of addressing and routing data.

BACKGROUND OF THE INVENTION

Multi-protocol label switching or MPLS is a framework specified by Internet Engineering Task Force (IETF) that provides efficient routing, forwarding and switching traffic flows through a telecommunication network. MPLS allows a mapping of Internet protocol (IP) addresses to fixed length labels used by routers and other equipment to route and switch packets. In MPLS, packets are transmitted on label-switched paths (LSPs), which are specified by a sequence of labels at each node along the path from the source to the destination. LSPs are established prior to packet transmission. The labels are distributed by protocols such as border gateway protocol (BGP). Each data packet encapsulates and carries the labels between the source and the destination. The devices that operate using MPLS can be classified into label edge routers (LERs) and label switching routers (LSRs), which route and switch the data packets at the edge and in the core of the network. Therefore, the MPLS label governs inter-node packet transmission.

SUMMARY OF THE INVENTION

Although MPLS labels are used to forward packets between nodes in a network, a need has arisen for a means to route the packets inside each network node. Furthermore, there is a need to determine the source port of a packet inside each network node so that a reply packet may be sent back to the source port for transmission to the source of the packet.

In accordance with an embodiment of the present invention, a method of routing packets in a system includes the steps of receiving a plurality of packets, each packet including a routing label and a packet type, routing each packet to a destination within the system specified in the routing label in response to the packet type being indicative of a data packet, and routing each packet to a processor within the system and sending a reply packet to a sender specified in the routing label in response to the packet type being indicative of a control packet.

In accordance with another embodiment of the present invention, a method of routing packets internally within a telecommunication system includes the steps of receiving a packet including a routing label and a packet type, routing the packet to a destination within the system specified in the routing label in response to the packet type being indicative of a data packet, and routing the packet to a processor within the system and sending a reply packet to a sender specified in the routing label in response to the packet type being indicative of a control packet.

In accordance with yet another embodiment of the present invention, a method of routing packets internally within a network node includes the steps of receiving a packet including a routing label, routing the packet to a destination within the system specified by a shelf identifier, a slot identifier and a link identifier in the routing label in response to the packet being a data packet, and routing the packet to a processor within the system and sending a reply packet to a sender specified by a shelf identifier, a slot identifier and a link identifier in the routing label in response to the packet being a control packet.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
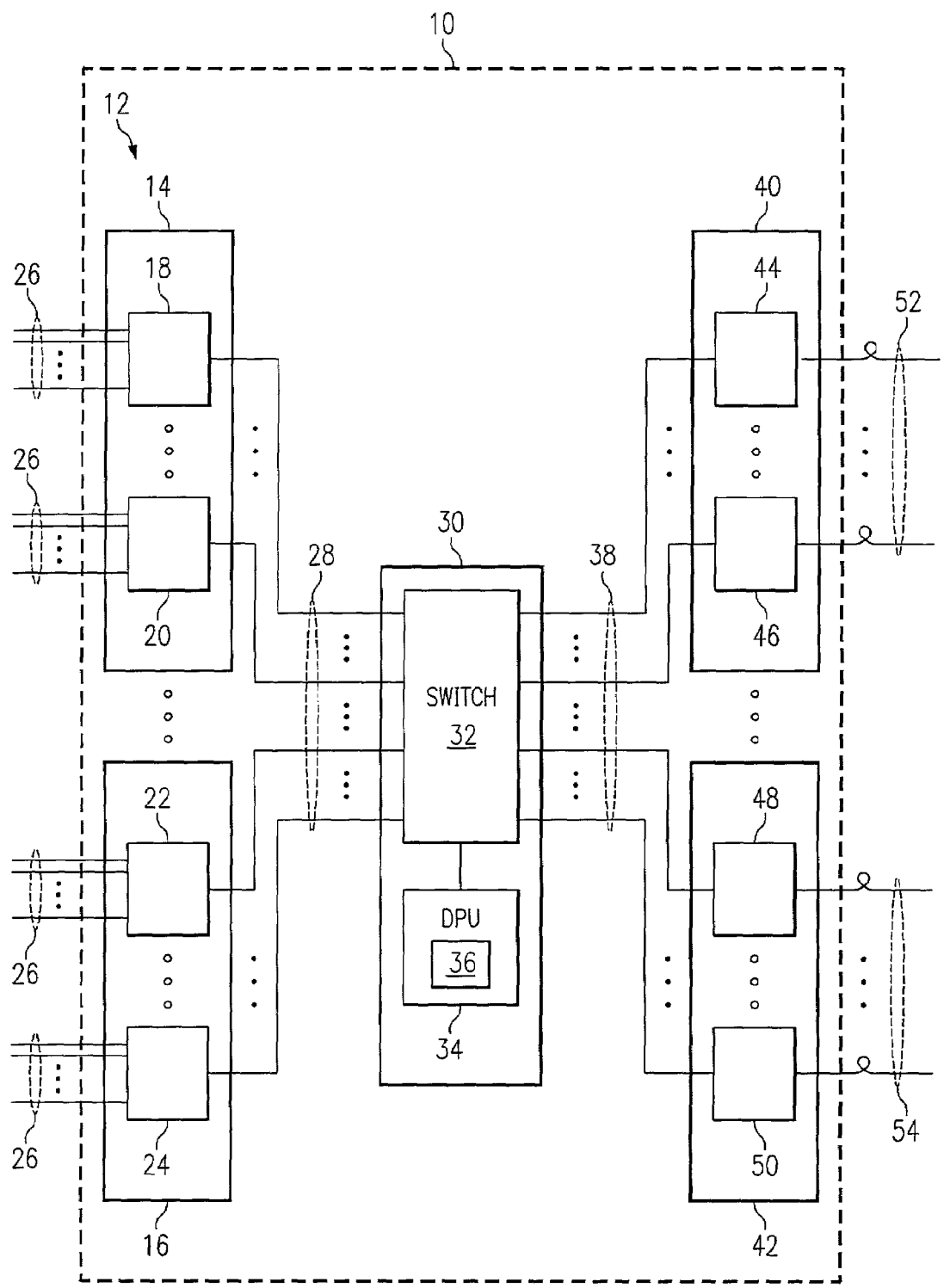
FIG. 1 is a block diagram of an exemplary system which may implement the addressing and routing scheme of the present invention.
Figure 2:
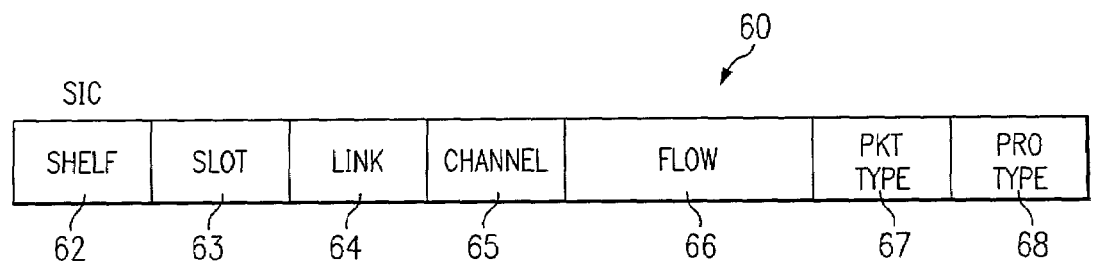
FIG. 2 is a diagram of an embodiment of a format of a routing label according to the teachings of the present invention.
Figure 3:
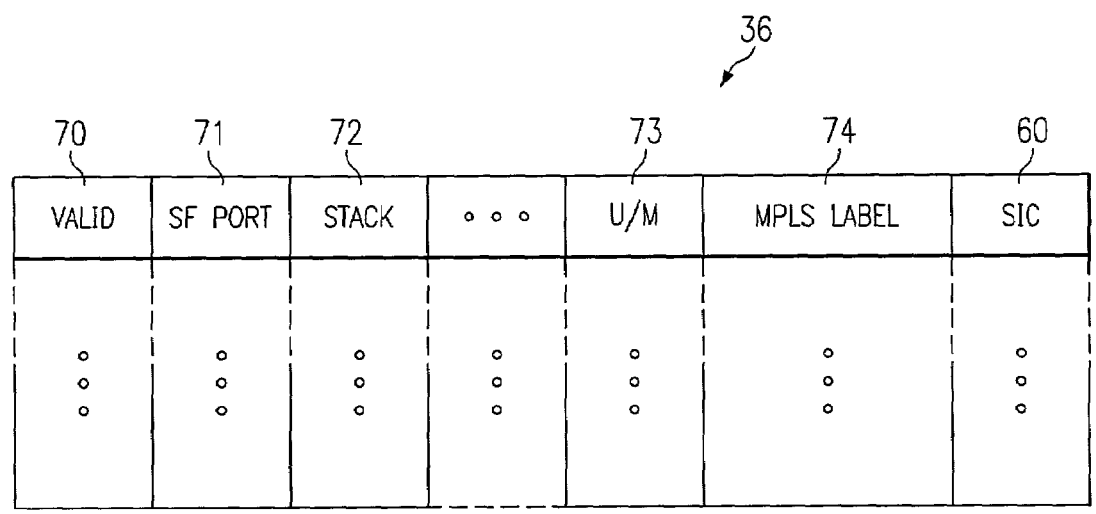
FIG. 3 is a diagram of an embodiment of a routing table according to the teachings of the present invention.

The preferred embodiment of the present invention and its advantages are best understood by referring to FIGS. 1 through 3 of the drawings, like numerals being used for like and corresponding parts of the various drawings.

FIG. 1 is a block diagram of an exemplary system 10, which may implement the addressing and routing scheme of the present invention. Like many telecommunications equipment, system 10 consists of a plurality of circuit cards plugged into a plurality of slots located on one or more shelves. System 10 includes a plurality of service cards such as Ethernet or SONET optical service cards 14 and 16 residing on one or more shelves 12, each with one or more components 18-24 such as network processors or other addressable circuits. Each component 18-24 includes one or more service ports 26 which are coupled to customer premises equipment (CPE) and a first set of ports 28 of a switch fabric 32. Service cards 14 and 16 may be interface cards such as 10/100 BaseT Ethernet, Gigabit Ethernet, OC-N service cards. Switch fabric 32 resides on a shelf 30 along with a data processing unit 34, which is also coupled to a port of the switch fabric. Data processing unit 34 possesses an address mapping table or label information base (in multi-protocol label switching terminology) 36 in memory or another form of data storage that may be accessed and updated. A second set of switch fabric ports 38 is coupled to a plurality of channel interface cards 44-50 residing on one or more shelves 40-42. Channel interface cards 44-50 are further coupled to the telecommunication network via interface ports 52 and 54. Although not shown explicitly, other circuit cards performing other functionality may be disposed or coupled between switch fabric 32 and channel interface cards 44-50.

In operation, data coming into system 10 via service cards 14-16 are routed via switch fabric 32 to the proper port 38 for transport to the telecommunication network via interface cards 44-50. Switch fabric 32 also routes data messages to data processing unit 34 for processing, and routing reply messages therefrom back to the senders. The addressing and routing scheme of the present invention provides a way to identify the origin and destination of the packet. In general, data transmission occurs on label-switched paths (LSPs) pursuant to multi-protocol label switching (MPLS). LSPs are a sequence of labels at each and every node along the path from the source to the destination. The labels may be distributed using protocols such as label distribution protocol (LDP), border gateway protocol (BGP), or other suitable protocols.

FIG. 2 is a diagram of an embodiment of a format of a routing label 60 according to the teachings of the present invention. Routing label 60, also called a shelf-interface-channel (SIC) label, includes a shelf field 62 and a slot field 63 that are used to contain a shelf number and a slot number assigned to the shelf and the slot, respectively, of the sender of the packet if the packet is destined for data processing unit 34. If the packet is not destined for data processing unit 34, then the shelf and slot fields contains the shelf and slot numbers of the shelf and slot of the destination circuit card. A link field 64 is used to contain the representation of the source physical link terminated on the slot if the packet is intended for the data processing unit 34, otherwise the link field contains the destination link. A channel field 65 is used to contain the channel number of a source channel multiplexed on the physical link if the packet is destined for data processing unit 34, otherwise the channel field contains the destination channel. Flow 66 is a field in the routing table to indicate the source virtual flow. A virtual flow is a logical representation or grouping of system components. A packet type field 67 is used to indicate whether the packet is a data packet, a traffic manager packet, a network processor packet, or a switch fabric interface (SFI) packet. In general, the packet type indicates the intended destination of the packet—a data packet is destined for an output port on system 10; a traffic manager packet is destined for a traffic manager (not explicitly shown) that resides in a circuit card specified by the shelf and slot fields; a network processor packet is destined for the network processor residing in a card specified by the shelf and slot fields; and a SFI packet is destined for data processing unit 34 coupled to a switch fabric port. A prototype field 68 is used to indicate whether the packet is an MPLS packet or a non-MPLS packet such as a packet for point-to-point protocol (PPP) negotiation. All fields are of an appropriate length in order to provide adequate information for each field.

FIG. 3 is a diagram of an embodiment of a routing table or label information base 36 according to the teachings of the present invention. Label information base 36 includes a field 70 for indicating whether the entry is valid. A switch fabric (SF) port field 71 contains a specification of the port number on the switch fabric the packet originated. A stack field 72 of label information base 36 contains the operation to be performed. For example, if the stack bit in field 72 is a 0, label switch routing (LSR) function is performed; if the stack bit in field 72 is a 1, label edge routing (LER) function is performed. LSR and LER are functions performed by the appropriate routers either within the core of an MPLS network or at the edge of the access network, respectively, as known in the art. A U/M field 73 is used to indicate whether the packet is for unicast or multicast. Label information base 36 also includes an MPLS label field 74. As known in the art, an MPLS label field 74 is used to contain the MPLS label, which includes a next hop value that functions as an index to an entry in label information base 36. MPLS label field 74 also includes an EXP field, which carries the class of service (CoS) if border gateway protocol is used to distribute the MPLS label or drop precedence if interior gateway protocol (IGP) is used. MPLS label field 74 also includes a stack bit, which is valid in the interior gateway protocol label to decide which label information base entry to index. A time-to-live field is also in the MPLS label, which is used in the interior gateway protocol to be decremented when a packet is received on the line. Finally, label information base 36 also includes SIC label 60 as described above and shown in FIG. 2.

In operation, SIC label 60 allows a packet to bear the shelf, slot, link and channel information of the source or the destination. If the packet type is SFI, the packet is destined for the control plane such as data processing unit 34. Because all packets destined for data processing unit 34 arrive from the same port on switch fabric 32 and could have originated from any other port of the switch fabric, the source of the packet has to be identified in order for a reply packet to be sent and routed. Therefore, SIC label 60 provides the shelf, slot, link and channel information that reflect the source of the packet, so that data processing unit 34 may send a reply packet back to the source for each received packet. If the packet type is not SFI, then the SIC label including the shelf, slot, link and channel numbers provides an identification of the destination of the packet. The SIC label, with the link and channel designations, provides a fine granularity of resolution so that a packet may be routed based on a specific port, wavelength, slot, and shelf of the destination. The SIC label is only valid within a piece of telecommunication equipment, such as a label switching router or a label edge router. In other words, the SIC label is only used for internal routing within each node located along the label switched paths.

The manner in which label information base is used is as in MPLS routing as known in the art. In general, a label stack mechanism is used to allow for hierarchical operation. Therefore, the MPLS label is used for routing between routers or some other equipment and the SIC label is used for routing within each router. Each level in a label stack pertains to the hierarchical level. Before any traffic begins the routers binds a label to a specific forward equivalence class (FEC) and builds the label information base tables. Downstream routers initiate the distribution of the labels and the label/FEC binding. On receipt of label bindings each LSR creates entries in the label information base. The contents of the label information base map the label to an FEC. The MPLS label in the label information base is used to find the next hop in the path, while the SIC label, according to the teachings of the present invention, is used to find the destination circuit card, link and channel within the router. Further, a fine granularity of resolution of the destination is provided by the present invention that is heretofore not available.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A method of routing IP packets within a node of a network, comprising:

receiving a packet at a first interface circuit within the node, the packet being an IP packet and including a label stack, the label stack including an external routing label for use in forwarding between nodes along a label-switched path;

pushing, at the first interface, an internal routing label on to the label stack of the packet to create a modified packet, the internal routing label specifying a packet type; the internal routing label further specifying an address for a second interface circuit within the node if the packet type is of a first type, and specifying the address of the first interface circuit if the packet type is of a second type, the second type being a type indicative of a control packet;

routing with a switch within the node the modified packet to the second interface circuit specified in the internal routing label in response to the packet type being indicative of a first type and to a control circuit associated with the second type if the packet is of the second type.

2. The method, as set forth in claim 1, wherein routing the modified packet to the second interface circuit comprises routing each modified packet by at least a shelf and slot numbers for a circuit card comprising the second interface circuit, the shelf and slot numbers being included in the internal routing label.

3. The method, as set forth in claim 1, wherein routing the modified packet to the second interface circuit comprises routing each modified packet based on a shelf identifier, a slot identifier, a link identifier, and a channel identifier for a circuit card comprising the second interface circuit, the shelf identifier, slot identifier, link identifier and channel identifier being included in the internal routing label.

4. The method, as set forth in claim 1, wherein routing the modified packet to the second interface circuit comprises:
receiving, from the first interface circuit, the modified packet at the switch; and
switching the modified packet to a predetermined port of the switch as specified by shelf and slot numbers comprising the address included in the internal routing label.

5. The method, as set forth in claim 1, wherein routing the modified packet to the second interface circuit comprises:
receiving the modified packet at the switch; and
routing the modified packet to a predetermined port of the switch as specified by a shelf identifier, a slot identifier, a link identifier, and a channel identifier comprising the address included in the internal routing label.

6. The method, as set forth in claim 1, further comprising popping the internal routing label from the label stack on the modified packet after receiving the modified packet at the second interface circuit.

7. The method, as set forth in claim 1, further comprising popping the internal routing label from the label stack after receiving the packet at the control circuit within the node.

8. The method, as set forth in claim 1, wherein routing the modified packet to the second interface circuit comprises:
receiving, from the first interface circuit, the modified packet at the switch; and
switching the modified packet to a predetermined port of the switch coupled to the second interface circuit specified in the internal routing label.

9. The method, as set forth in claim 1, wherein routing the modified packet to the second interface circuit comprises:
receiving, from the first interface circuit, the modified packet at the switch; and
switching the modified packet to the second interface circuit coupled to a predetermined port of the switch as specified by at least a shelf identifier and slot identifier, included in the internal routing label.

10. The method of claim 1, further comprising sending a reply packet to the first interface circuit specified in the internal routing label in response to the packet type being indicative of a control packet.

11. The method, as set forth in claim 10, wherein sending the reply packet to the first interface circuit comprises routing the reply packet based on an address contained in a second internal routing label included with the reply packet, the address in the second internal routing packet including the shelf and slot numbers included in the address of the internal routing label of the modified packet.

12. The method, as set forth in claim 10, wherein sending the reply packet to the first interface circuit comprises routing the reply packet based on a shelf identifier, a slot identifier, a link identifier, and a channel identifier included in the internal routing label for the modified packet.

13. The method, as set forth in claim 10, wherein routing the modified packet to the control circuit and sending the reply packet comprises:
receiving the modified packet at the switch;
switching the modified packet to a predetermined port of the switch coupled to the control circuit; and
switching the reply packet to a second predetermined port of the switch specified by shelf and slot numbers included in the internal routing label.

14. The method, as set forth in claim 10, wherein routing the modified packet to the control circuit and sending the reply packet to the first interface circuit comprises:
receiving the modified packet at the switch;
switching the modified packet to a predetermined port of the switch coupled to the control circuit; and
switching the reply packet to the first interface card, the reply packet containing a second internal routing label specifying the shelf identifier, the slot identifier, the link identifier, and the channel identifier included in the internal routing label for the modified packet.

15. The method, as set forth in claim 10, further comprising popping the internal routing label from the label stack after receiving the modified packet at the control circuit within the node.

16. An apparatus at a node of a network, comprising:
a plurality of addressable circuits and a switching fabric, the plurality of addressable circuits comprising a first interface circuit and a second interface circuit;
the first circuit comprising means for receiving a packet, the packet being an IP packet and including a label stack, the label stack including an external routing label for use in forwarding between nodes along a label-switched path;
the first circuit further comprising means for pushing an internal routing label to the label stack of the packet to create a modified packet, the internal routing label including a packet type identifier and an address of one of the plurality of addressable circuits; the address specifying the second interface circuit, from which the modified packet will be transmitted by the apparatus to another node, if the packet type identifier indicates a data type, and the address specifying the first interface circuit if the packet type identifier is a control type;
the switching fabric including means for routing the modified packet through the switching fabric to one of the plurality of circuits based on the internal routing label attached to the modified packet, the means for routing the modified packet based on the address in the internal routing label if the packet type identifier indicates a data type;
the second interface circuit comprising means for removing the internal routing label prior to transmission of the packet from the apparatus.

17. The apparatus of claim 16, wherein a control circuit is comprised of a processor, the processor including means for sending a reply packet, in response to receiving a modified control packet, to the first circuit, which is identified in the internal routing label.

18. The apparatus of claim 16, wherein the means for routing includes means for routing the modified packet to a control circuit based on the packet type if the packet type identifier indicates a control packet type.

19. The apparatus of claim 16, wherein the internal routing label includes at least one field for identifying the location of one of the plurality of the circuits within the apparatus.

20. The apparatus of claim 19, wherein the at least one field for identifying the location of one of the plurality of circuits within the apparatus includes identifiers for a shelf and a slot of a card for the one of the plurality of circuits.

21. The apparatus of claim 16, further comprising memory for storing a routing table, the routing table including fields for the external label and the internal routing label.

* * * * *